Dec. 16, 1952
C. A. CALLAHAN
2,621,454
POWER-DRIVEN CUTTING BLADE AND
SHARPENING APPARATUS THEREFOR
Filed July 26, 1950
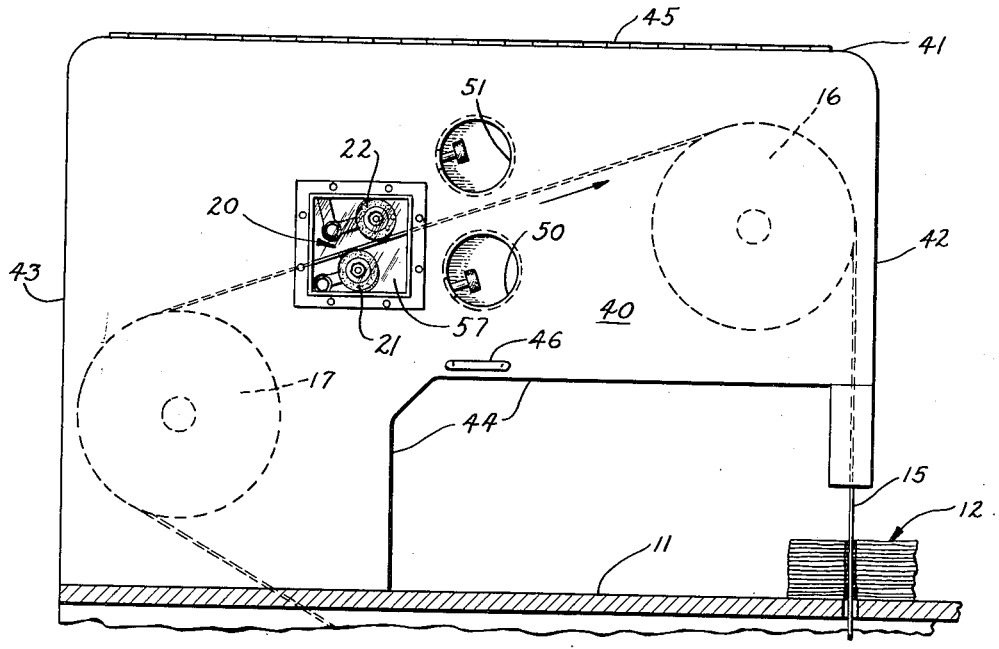
FIG. 1
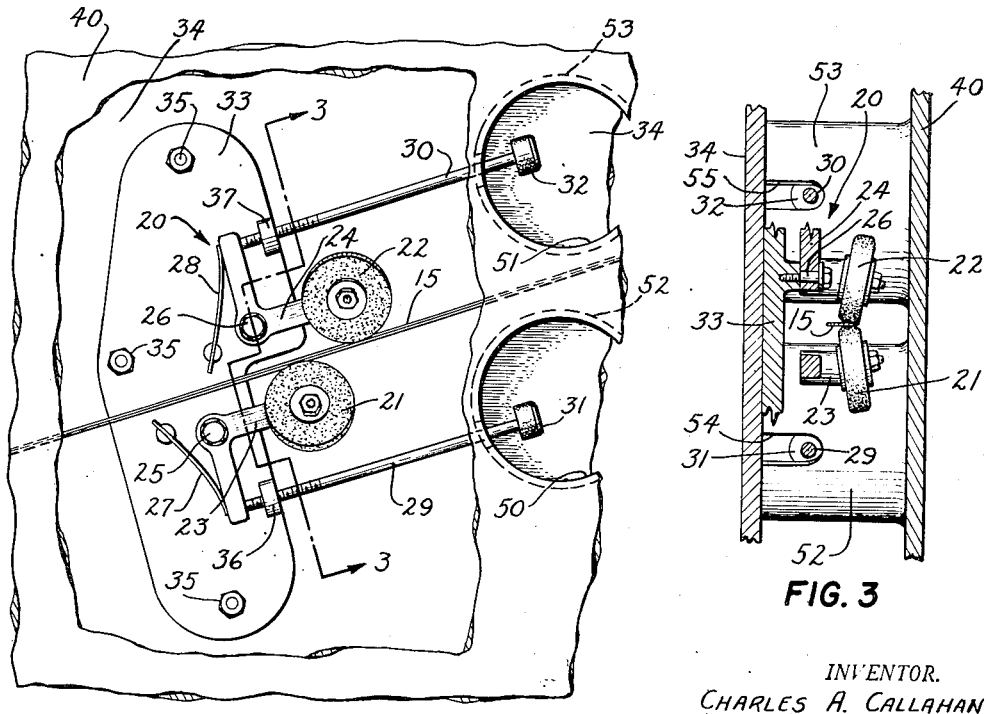
FIG. 2
FIG. 3
INVENTOR.
CHARLES A. CALLAHAN
BY
*D. G. Snyder*
*Roderick B. Jones*
ATTORNEYS Patented Dec. 16, 1952

2,621,454

UNITED STATES PATENT OFFICE 2,621,454

POWER-DRIVEN CUTTING BLADE AND SHARPENING APPARATUS THEREFOR

Charles A. Callahan, Philadelphia, Pa.

Application July 26, 1950, Serial No. 176,041

1 Claim. (Cl. 51—248)

(Granted under the act of March 3, 1883, as amended April 30, 1928; 370 O. G. 757)

The invention described herein may be manufactured and used by or for the Government of the United States of America for governmental purposes without the payment of any royalties thereon or therefor.

This invention pertains to the art of sharpening power-driven cutting blades, and it comprises a structure that protects persons against danger of injury while the cutting blade is being sharpened.

The invention embodies a housing enclosing the power-driven cutting blade, and sharpening apparatus for the cutting blade operable while the blade is in motion. The apparatus thus operates to sharpen the blade while the blade performs its cutting operation. The novel structure enables the sharpening apparatus to be adjusted relative to the cutting blade to control the pressure applied for sharpening the blade, enabling these adjusting operations to be performed manually while the housing is in protective position. The adjustment may be made while the blade is engaged in performing the cutting operation for which it is intended.

The principles of the invention, as also a practical embodiment thereof, will be more clearly understood from the accompanying drawings to which attention is now directed.

In the drawings:

Fig. 1 is front elevation of so much of a machine as embodies the present invention;

Fig. 2 is a fragmentary detail of the machine of Fig. 1, with parts broken away for clearness of illustration, and Fig. 3 is a cross-sectional elevation, taken on line 3—3 of Fig. 2.

The invention is disclosed in the form of its practical application in a machine for cutting fabric.

The fabric-cutting machine of Fig. 1 comprises a cutting table 11 on which textile fabric 12 rests, and along which the fabric 12 is slid and guided to be cut by the cutting blade 15. The textile fabric 12 consists of a stack of fabric pieces, which are to be cut to a predetermined border contour in accordance with a pattern, the several pieces of the stacked fabric thus being cut to constitute like pieces that are seamed to other pieces by sewing, for example, to produce a plurality of like garments.

The cutting blade 15 is of the endless-band variety, which is sharp along its edge that is directed towards the observer in Fig. 1. The endless band 15 travels over the idler wheels 16 and 17 in the direction of the arrow in Fig. 1, and downwardly from the pulley 16 through the table 11, which is slotted to form a passage for the blade. The endless band 15 is driven in the direction of the arrow by any suitable and well-known mechanism, which is not shown, the driving mechanism being unnecessary for understanding the present invention.

In the machine of the disclosed construction, the cutting blade 15 is sharpened continuously, and sharpening apparatus 20 is provided for the purpose. Sharpening apparatus 20 operates to keep the cutting blade 15 constantly in condition for efficient cutting, and also the cutting characteristics of the blade are maintained uniform.

Sharpening apparatus 20 comprises the set of grinding wheels 21 and 22, which are mounted to bear against and roll along the cutting edge of blade 15 at its path of travel from pulley 17 to pulley 16. Wheels 21 and 22 press opposed to to each other on respective opposite sides of the blade 15.

Mounting of each of the wheels 21 and 22 is adjustable to vary the magnitude of pressure under which it bears against the blade 15, an object being to abrade the cutting edge of blade 15 only so much as is needed to maintain efficient and uniform cutting properties. Accordingly, the wheel 21 is carried by the movable bracket 23, and wheel 22 is similarly carried by movable bracket 24, the brackets 23 and 24 each comprising a bellcrank lever respectively pivoted at 25 and 26. Spring 27 actuates bracket 23 to press the wheel 21 upwardly against the lower side of the blade 15, and spring 28 actuates bracket 24 to press the wheel 22 downwardly against the upper side of the blade 15. The grinding wheels 21 and 22 are preferably not positioned directly opposite each other, but instead the wheel 22 is positioned at a point somewhat further along from wheel 21 in the path of travel of the blade 15. Adjustment member 29 operates opposed to spring 27 to control the pressure of the wheel 21 against the blade 15, and similarly the adjustment member 30 operates opposed to the spring 28 to control the pressure of wheel 22 against the opposite side of the blade.

Movable brackets or levers 23 and 24 are carried by the base plate 33, which is secured to the upright panel 34 of the machine by means of bolts 35, for example. Base plate 33 includes the lugs 36 and 37, and each of the adjustment members 29 and 30 is in the form of a bolt that is threaded through its respective lug 36 and 37 and is held thereby directed towards its respective companion bracket 23 and 24, traverse of each bolt 29 and 30 being in a direction opposed to its respective spring 27 or 28. Each of the adjusting members 29 and 30 is provided with a knob 31, and 32 respectively, which serves as a handle for making adjustments.

The endless cutting blade 15 is completely housed, and this prevents injury to a person near the machine in the event that the blade breaks while it is travelling in operation of the machine. The housing is positioned where it also encloses the sharpening apparatus 20, which is a critical position where pressure is applied that may break the blade 15.

The housing comprises a front panel 40 spaced forwardly of the panel 34 as a back panel, panel 40 being in front of the blade 15 and the sharpening apparatus 20 and panel 34 being behind. Along the top edge 41 of panel 40, the side edges 42 and 43, and the bottom edges 44, there are bordering panels which close the space between the front and back panels 40 and 34 that contains the sharpening apparatus 20, the table 11 completing the closure. The travelling blade 15 is thus completely closed, particularly at the sharpening apparatus 20 where danger of its breaking is greatest, and the operator is thus completely protected from injury during operation of the machine and while the blade 15 is being sharpened.

The panels at 41, 42, 43 and 44 are attached peripherally to the front panel 40 to constitute a unitary structure therewith which is mounted to be swung towards and away from back panel 34 on the hinge 45 at the top. The handle 46 is attached to the housing of panel 40 to facilitate the housing being opened in the manner described.

The housing of panel 40 should be in protective closed position, not only while the sharpening apparatus 20 is operating, but also while it is being adjusted. This is particularly important because the adjusting mechanism which comprises springs 27, 28 and companion adjustment members 29, 30 operates to vary the pressure of grinding wheels 21 and 22 against the blade 15, and the danger of the blade 15 breaking is increased thereby during the adjusting operation.

The front panel 40 is provided with the apertures 50 and 51 respectively proximate to the adjusting members 29 and 30. Apertures 50 and 51 serve as hand holes that permit access to the handles 31 and 32 of the respective adjusting members 29 and 30. Partitions 52 and 53 enclose the spaces inside respective apertures 50 and 51 that are occupied by respective knobs 31 and 32 and the hand of the operator when adjustment is being made, and they are thus positioned between the hand of the operator and the blade 15. The blade 15 is thus confined to prevent it from striking the hand of the operator if it becomes broken.

Partitions 52 and 53 are attached to the front panel 40 peripherally of the respective apertures 50 and 51 as illustrated in Fig. 3, and they project rearwardly of front panel 40 into engagement with the back panel 34. Slot 54 of partition 52 is an aperture in the housing only large enough to accommodate adjustment member 29, and slot 55 of partition 53 is similarly an aperture in the housing only large enough to accommodate adjustment member 30. Members 29 and 30 extend away from their respective lugs 36 and 37 through respective slots 54 and 55 and handles 31 and 32 are thereby positioned inside their respective partitions 52 and 53 and exteriorly of the housing of front panel 40.

The front panel 40 is provided with an area 57 of transparent material which serves as a window through which the operator is able to observe his adjustment of wheels 21 and 22 with reference to the blade 15.

When a blade 15 becomes broken, or needs to to be replaced or repaired, handle 46 is lifted to swing the front panel 40 on the hinge 45 and raise it out of the way. The front panel 40 is lifted out of the way in the same manner when grinding wheels 21 and 22 are replaced or removed for repair, as also for any other replacement or repair in the housing while the machine is not in operation. But whenever the machine is in operation and the cutting blade 15 is in motion, the panel 40 is lowered into protective position.

The panel 40 is in protective position while either of the grinding wheels 21 and 22 is being adjusted to bear against the cutting edge of blade 15 with the required degree of pressure for the desired amount of abrasion. The operator inserts his hand into the space confined by the partition 52 to rotate the handle 31 manually for adjusting the wheel 21, and in a like manner he inserts his hand into the space confined by the partition 53 to rotate the handle 32 manually for adjusting the wheel 22. The operator observes the correctness of the adjustment he is making through window 57. The adjustments are thus made safely while the blade 15 is travelling in operation. These adjustments may be made with complete safety while the machine is operating to cut fabric 12, which enables the operator to observe the effectiveness of the adjustment by observing the effect on the fabric being cut.

The accompanying disclosure is one practical application of the invention, which is susceptible of a number of modifications within the scope thereof. The scope of the invention is determined by the accompanying claim, to which attention is now directed.

I claim:

In a machine comprising a power-driven cutting blade apparatus to sharpen the blade, the sharpening apparatus comprising a sharpening tool and mechanism for adjusting its position relative to the blade, a housing comprising a front panel and a back panel respectively in front of and behind the sharpening apparatus and the cutting blade and comprising bordering side walls extending rearwardly from the front panel to the back panel to enclose the sharpening apparatus and cutting blade, an adjusting member comprising a handle at its end for manually operating the adjusting mechanism and extending alongside and between the panels behind the front panel, a hand opening through the front panel opposite the handle of the adjusting member and a partition peripherally of the hand opening and extending rearwardly from the front panel to the back panel into position around the handle whereby the sharpening apparatus is adjustable with the housing in protective position.

CHARLES A. CALLAHAN.

REFERENCES CITED

The following references are of record in the file of this patent:

UNITED STATES PATENTS

| Number | Name | Date |
|---|---|---|
| 222,732 | Plass | Dec. 16, 1879 |
| 679,056 | Lewis | July 23, 1901 |
| 720,227 | Cormany | Feb. 10, 1903 |
| 860,530 | Cormany | July 16, 1907 |
| 1,060,916 | Luschka | May 6, 1913 |
| 1,160,946 | Nangle | Nov. 16, 1915 |
| 1,255,040 | Ousley | Jan. 29, 1918 |
| 1,263,414 | Hopkinson et al. | Apr. 23, 1918 |
| 1,511,788 | Vaughan | Oct. 14, 1924 |
| 1,772,705 | Campbell | Aug. 12, 1930 |
| 1,797,261 | Hallam | Mar. 24, 1931 |
| 1,977,386 | Holes | Oct. 16, 1934 |
| 2,291,260 | Streckfuss et al. | July 28, 1942 |
| 2,414,152 | Jackson | Jan. 14, 1947 |
| 2,324,380 | Frei | July 13, 1943 |

FOREIGN PATENTS

| Number | Country | Date |
|---|---|---|
| 5,282 | Great Britain | July 22, 1915 |
| 18,075 | Great Britain | Dec. 11, 1888 |
| 23,746 | Great Britain | Dec. 6, 1894 |
| 666,908 | Germany | Oct. 31, 1938 |
| 968,860 | France | May 10, 1950 |